UNITED STATES PATENT OFFICE.

ALBERT P. CROMWELL, OF FLORIDA, NEW YORK.

INSECTICIDE.

No. 807,249.  Specification of Letters Patent.  Patented Dec. 12, 1905.

Application filed June 12, 1905. Serial No. 264,902.

*To all whom it may concern:*

Be it known that I, ALBERT P. CROMWELL, a citizen of the United States, residing at Florida, in the county of Orange and State of New York, have invented new and useful Improvements in Insecticides, of which the following is a specification.

This invention relates to a novel composition for use in destroying insects or vermin.

The composition consists of the following ingredients, combined in the proportions or substantially the proportions stated: benzin, one quart; hellebore, four ounces; nightshade, four ounces; laurel, four ounces; water, four quarts. The hellebore, nightshade, and laurel are boiled together with the water for about two hours. Then the liquid is strained off and the benzin is added and the composition thoroughly agitated until the benzin is intimately incorporated with the other ingredients. This composition will destroy insects or vermin of all kinds by contact. It may be applied in full strength for the destruction of household vermin or diluted with water for use in spraying or sprinkling upon trees, plants, flowers, or shrubs for the destruction of insects on the same or for saturating the ground around the plants for killing worms, such as cut-worms.

The composition is a very efficacious insecticide, being practically instantaneous in its action.

What I claim as new, and desire to secure by Letters Patent, is—

1. The herein-described composition of matter for use as an insecticide, comprising benzin, hellebore, nightshade, laurel and water.

2. The herein-described composition of matter for use as an insecticide, comprising benzin, hellebore, nightshade, laurel and water combined in substantially the proportions specified.

In testimony whereof I have hereunto set my hand in presence of two subscribing witnesses.

ALBERT P. CROMWELL.

Witnesses:
 THEODORE SMITH,
 BERT CROMWELL.